United States Patent [19]

Kato

[11] Patent Number: 4,747,799

[45] Date of Patent: May 31, 1988

[54] ROTATION COUPLING DEVICE WITH MEANS FOR SUPPRESSING STATIONARY WAVE VIBRATIONS

[75] Inventor: Kiyomitsu Kato, Shimada, Japan

[73] Assignee: Yazaki Corporation, Tokyo, Japan

[21] Appl. No.: 6,352

[22] Filed: Jan. 14, 1987

Related U.S. Application Data

[63] Continuation of Ser. No. 678,047, Dec. 4, 1984, abandoned.

[30] Foreign Application Priority Data

Dec. 6, 1983 [JP] Japan .............................. 58-187502[U]

[51] Int. Cl.⁴ .............................. F16C 1/06; F16C 1/28
[52] U.S. Cl. ...................................... 464/52; 464/180
[58] Field of Search .................. 74/501 P; 464/52, 53, 464/57, 58, 60, 173, 174, 178, 179, 180, 181, 183

[56] References Cited

U.S. PATENT DOCUMENTS

| | | | |
|---|---|---|---|
| 1,481,078 | 1/1924 | Albertson | 464/52 |
| 2,884,771 | 5/1959 | Holt | 464/53 |
| 2,889,695 | 6/1959 | Moeller | 464/180 |
| 3,085,406 | 4/1963 | Hanebuth | 464/52 |
| 3,258,031 | 6/1966 | French . | |
| 3,287,980 | 11/1966 | Gilliland | 464/52 X |
| 3,292,389 | 12/1966 | Adloff et al. | 464/180 X |
| 3,389,579 | 6/1968 | Werner et al. | 464/173 X |
| 3,581,523 | 6/1971 | Bartholomew | 464/174 X |
| 4,112,708 | 9/1978 | Fukuda | 464/174 X |
| 4,126,928 | 11/1978 | Hoff | 464/173 X |
| 4,424,045 | 1/1984 | Kulischenko et al. | 464/52 |

FOREIGN PATENT DOCUMENTS

| | | | |
|---|---|---|---|
| 752264 | 9/1933 | France | 464/53 |
| 29740 | 9/1910 | United Kingdom | 464/52 |
| 453105 | 9/1936 | United Kingdom | 464/52 |

Primary Examiner—Daniel P. Stodola
Attorney, Agent, or Firm—Foley & Lardner, Schwartz, Jeffery, Schwaab, Mack, Blumenthal & Evans

[57] ABSTRACT

Stationary wave vibrations in a rotation coupling device comprising a rotating shaft disposed within a tubular sheath are suppressed by providing the sheath at the crests of the stationary wave with inwardly projecting vibration suppressing device, such as tubular sheath joints with inward protrusions or vibration suppressing rings disposed inside the sheath, which reduce the inner diameter of the sheath at the wave crests compared to the inner diameter of the rest of the sheath.

6 Claims, 2 Drawing Sheets

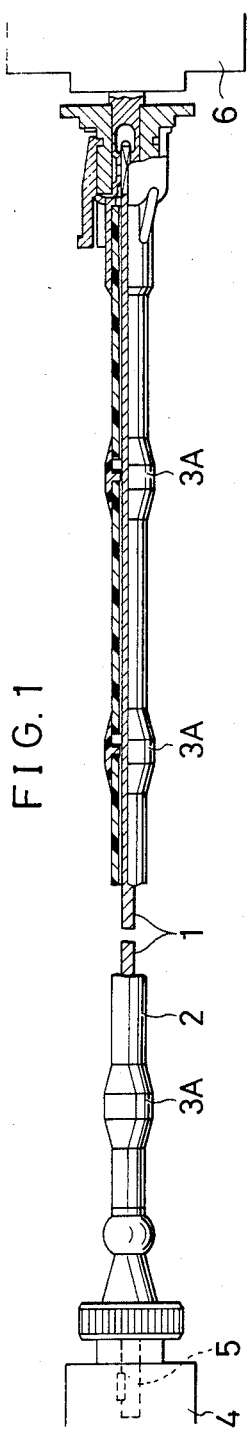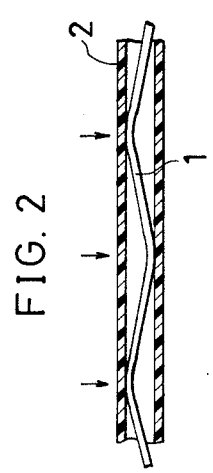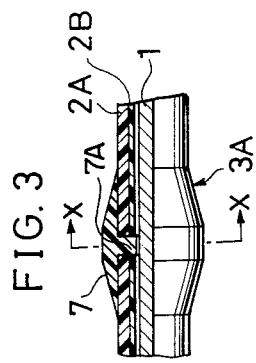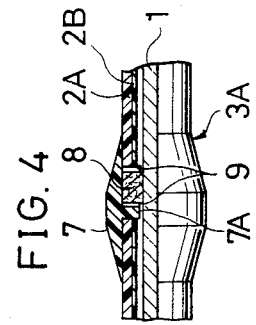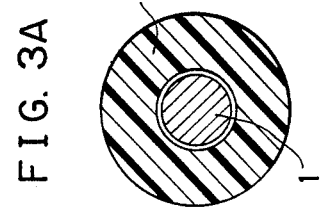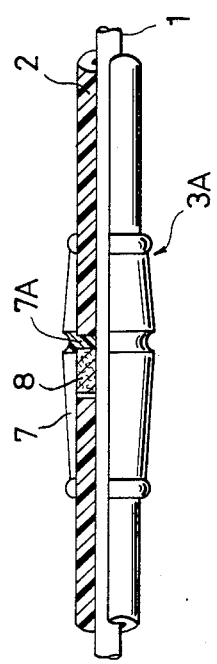

ROTATION COUPLING DEVICE WITH MEANS FOR SUPPRESSING STATIONARY WAVE VIBRATIONS

This application is a continuation of application Ser. No. 678,047, filed Dec. 4, 1984, now abandoned.

FIELD OF THE INVENTION

This invention relates to a rotation coupling device.

BACKGROUND OF THE INVENTION

In general, to transmit the rotation of a vehicle transmission to a measuring device such as a speedometer, a rotation device including a flexible shaft inserted through a tubular sheath is used.

Previously, in this kind of rotation coupling device, the clearance between the flexible shaft and the liner of the tubular sheath had to be kept as small as possible in order to suppress the noise of rotation knocking sound and the vibration of the speedometer needle that occurs due to stationary wave vibrations.

However, this technique has the following disadvantages.

1. It is difficult to control the inner diameter of the tubular sheath liner so as to minimize the clearance.
2. Changes of the inner diameter of the liner, when bending occurs, increase the resistance to sliding of the rotating shaft, which in turn shortens the lifetime of the rotating shaft.
3. The amount of lubricant that can be injected inside the tubular sheath is reduced, which also shortens the lifetime of the rotating shaft.
4. It is hard for the shaft to bend, which makes the positioning of the tubular sheath difficult.

SUMMARY OF THE INVENTION

One object of this invention is to resolve the difficulties listed above and to provide an improved rotation coupling device which can prevent the rotating knocking sound and the speedometer needle vibration without need to reduce the clearance between the tubular sheath liner and the rotating shaft.

Another object of the present invention is to suppress the stationary wave vibrations of the flexible rotating shaft and thus to suppress the noise of the rotation knocking sound of the rotating shaft.

In order to accomplish the above objectives, in this invention, special measures are taken at the parts of the tubular sheath corresponding to troughs and ridges, that is to say crests, of the stationary wave vibrations which occur in the flexible rotation shaft inserted through the tubular sheath of the rotation coupling device, whereby such crests of the vibrations are prevented from becoming large.

These and other aspects and advantages of the invention will become apparent by reference to the following detailed description of preferred embodiments when considered in conjunction with the accompanying drawing, wherein like numerals correspond to like elements throughout the drawing.

BRIEF DESCRIPTION OF THE DRAWINGS

FIG. 1 is a partial cutaway front elevational view of a rotation coupling device according to one embodiment of this invention.

FIG. 2 is a simplified cross-sectional view showing stationary wave vibrations of a rotating shaft inside a tubular sheath.

FIG. 3 is an enlarged partial cross-sectional view of the tubular sheath joint as shown in FIG. 1.

FIG. 3A is a sectional view taken along line X—X in FIG. 3.

FIG. 4 is an enlarged partial cross-sectional view of the tubular sheath joint in another embodiment of this invention.

FIG. 5 is an enlarged partial cross-sectional side view of the tubular sheath joint in still another embodiment of this invention.

FIG. 7 is a partial cutaway perspective view of the part of rotation coupling device in which a vibration suppression ring is built in.

DETAILED DESCRIPTION OF EMBODIMENTS

Figure 6:
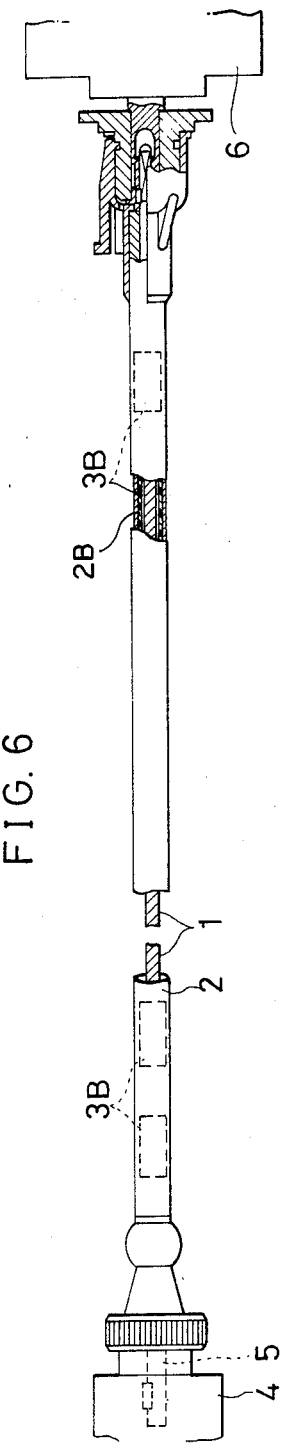
FIG. 6 shows a partial cutaway front elevational view of a rotation coupling device which is another embodiment of this invention.

In the rotation coupling device of this invention shown in FIG. 1, a flexible shaft 1 having an outer diameter of, for example, 3.2 mm is passed through a tubular sheath 2 having, for example, an inner diameter of 4.2 mm and an outer diameter of 7.7 mm. As will be explained in more detail below, a tubular sheath joint 3A is installed at at least one location along the axial direction of the tubular sheath 2. One end of the tubular sheath 2 is coupled to a shaft 5 in a drive shaft 4 and the other end is coupled to a driven member 6.

When rotation is transmitted from the drive shaft 4 on the drive side to the flexible shaft 1, there is a tendency for the bending and deviation from center that occurs at the joint with the drive shaft 4 and the shaft 5 to continuously generate stationary wave vibrations of the rotating shaft 1 at the characteristic frequency of the system.

These stationary wave vibrations involve undulation of the rotating shaft 1 inside the tubular sheath 2, as shown in FIG. 2, and are propagated along the entire length of the rotating shaft 1 from the drive shaft 4 to the driven member 6. The rotating shaft 1 strikes the inner wall or liner of the tubular sheath 2 producing a knocking sound, which is noisy, and also causing the speedometer needle to vibrate.

In addition, it also sometimes happens that these stationary wave vibrations are also generated at the joint with the driven member 6 and propagated back toward the drive shaft 4.

Some crests of stationary wave vibrations generated in this manner are shown and indicated by the arrows in FIG. 2. In this invention, at every location where a wave crest occurs (at intervals of ½ wave length), a tubular sheath joint 3A is installed in the tubular sheath 2. By forming joints which reduce the inner diameter of the tubular sheath inner wall at these points, the growth of the crests of the vibrations of the rotating shaft 1 at these points is limited and absorbed, and the stationary wave is weakened and suppressed.

As shown in FIG. 3, tubular sheath 2 comprises an outer tubular cover member 2A and an inner liner 2B. The outer tubular cover member 2A may be made of resin material. Tubular sheath 2 is cut at a location where a wave crest of flexible rotating shaft 1 occurs and divided into two tubular portions. A tubular sheath joint 3A is provided to join the tubular portions of tubular sheath 2. Tubular sheath joint 3A comprises a generally cylindrical body 7 with tapered edges and a radially inwardly protruding annular member 7A formed at a central position on the inner surface of cylindrical body 7. As shown in FIGS. 3 and 3A, protruding member 7A has an inner diameter smaller than the inner diameter of inner liner 2B so as to oppose flexible rotating shaft 1 through a slight gap therebetween. As a result, the crest of a stationary wave vibration of the rotating shaft, i.e the antinodal point of the stationary wave, is regulated by protruding portion 7A.

In order to secure tubular joint 3A onto tubular sheath 2, the ends of the tubular sheath portions are respectively inserted into opposite ends of cylindrical body 7, and the cylindrical body is bonded to the outer tubular cover member 2A of the tubular sheath by heat welding. For example, the total length of cylindrical body 7 may be 30 mm, and the thickness 7.8 mm at the center in this embodiment. Assuming the dimensions given above for the flexible shaft and sheath, the inner diameter of the annular protruding member may, for example, be 4 mm.

In addition, as shown in FIG. 4, to eliminate the unevenness at the cut edge surface of the outer tubular cover member 2A, a buffer means 8 is installed through a washer 9 inside the joint cover 7 over the cut so as to contact the rotating shaft 1.

This buffer means 8 which is made of, for example, felt suppresses the vibration of the rotating shaft 1. Not only that, but it absorbs the small vibrations propagated from the drive shaft 4 to suppress the propagation of vibrations to the tubular sheath 2.

FIG. 5 shows one embodiment of such a joint cover 7 having the opposite ends thereof raised.

Figure 7:
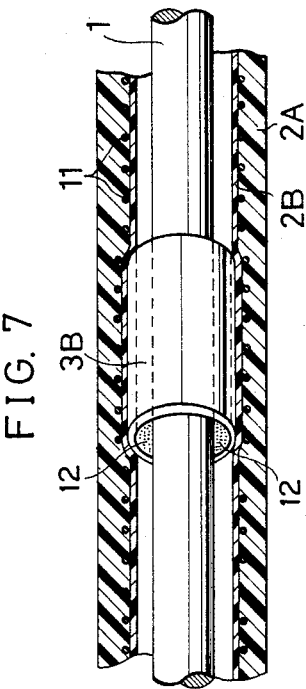

In the embodiment shown in FIG. 6, as shown in more detail in FIG. 7, cylindrical vibration suppressing rings 3B having an inner diameter larger than the outer diameter of the rotating shaft 1, are installed inside the tubular sheath 2 so as to contact the tubular sheath inner liner 2B at the crests of the stationary wave vibrations, that is to say, at half-wavelength intervals. This method is appropriate when the outer tubular cover member of the tubular sheath 2 has a braided copper wire component 11.

The vibrations of the rotating shaft 1 are suppressed and absorbed when the rotating shaft 1 at the crests thereof contacts with the vibration suppression rings 3B, and thereby the stationary wave is also suppressed. In addition, lubricant accumulates in the spaces between these vibration suppression rings 3B, which helps the rotating shaft 1 last longer. These vibration suppression rings 3B do not interfere with the rotation of the rotating shaft 1.

Figure 8:
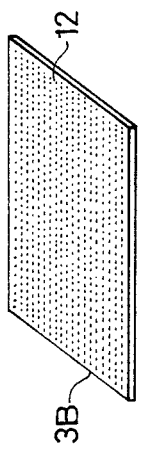
FIG. 8 is a diagonal perspective view of the opened state of a vibration suppression ring.

The vibration suppression rings 3B are made of metal or plastic. Before installation inside the tubular sheath 2, they are formed as flat plates as shown in FIG. 8. It is desirable for one side which will be the inside after the ring is curled up to be covered with, for example, short nylon bristles 12 to increase the vibration suppressing effect.

The dimensions of each vibration suppression ring could be, for example, length 10 mm, outer diameter 4.3 mm and thickness 0.2 mm to conform to the other dimensions given of the rotating shaft above. The short bristles could, for example, be 0.3 mm long and 1.5 denier in thickness with a density of at least 20 bristles/mm$^2$.

Figure 9:
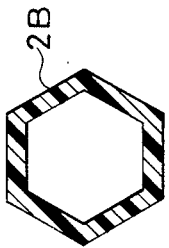
FIG. 9 is a cross-sectional view of a tubular sheath liner for use in a rotation coupling device of the present invention.

If the liner member 2B of the tubular sheath 2 is made with a hexagonal cross-section, as shown in FIG. 9, lubricant such as grease can accumulate in the corners, increasing the lifetime of the rotating shaft 1 still further.

In operation, in a rotation coupling device with the configuration of this invention, when rotation is transmitted from the drive shaft 4 to the flexible rotating shaft 1, there is a tendency for stationary wave vibrations to occur in the flexible rotating shaft 1, but these vibrations are suppressed by the tubular sheath joint vibration suppression rings, preventing noise and speedometer needle vibrations due to the rotation knocking sound of the rotating shaft. In particular, in a case such as in a front wheel drive vehicle in which the rotating shaft is short and it is easy for transmission vibrations to be propagated, the vibration suppression effect is great and noise is considerably reduced.

The existence of the vibration suppression rings 3B (or, in the case of tubular sheath joints 3A, the existence of the buffer means 8) increases the accumulation of lubricant, which extends the life of the rotating shaft.

Finally, in the device of this invention, the following point is worthy of attention. Since small-diameter parts are made separately and then installed one at a time, it is easy to control their dimensions. The effective thickening of the tubular sheath walls reduces the variation in inner diameter due to bending. In addition, since the tubular sheath joint covers are tapered in an umbrella shape, the tubular sheath joints and the tubular sheath bend with nearly the same radius of curvature.

While preferred embodiments of this invention have been shown and described, it will be appreciated that other embodiments will become apparent to those skilled in the art upon reading this disclosure, and, therefore, the invention is not to be limited by the disclosed embodiments.

What is claimed is:

1. A rotation coupling device for use between a drive member and a driven member for suppressing stationary wave vibrations, said device comprising:
    a tubular sheath;
    a flexible rotating shaft inserted through said tubular sheath; and
    a plurality of longitudinally spaced means for suppressing stationary wave vibrations occurring along said flexible rotating shaft during rotation thereof, each said means comprising a tubular sheath joint mounted on said tubular sheath, and each said means being disposed at an antinodal point of the stationary wave vibration; and
    wherein said tubular sheath comprises a plurality of tubular portions, and said tubular sheath joint comprises a cylindrical body having an inner diameter substantially corresponding to the outer diameter of said tubular sheath portions, said tubular sheath joint further comprising a radially inwardly protruding annular member formed on the inner surface of said cylindrical body having an inner diameter slightly larger than the outer diameter of the rotating shaft; said tubular portions of said sheath being joined by inserting their respective ends into said cylindrical body.

2. A rotation coupling device according to claim 1, further comprising a buffer means provided between an axial surface of said protruding member and the end of a tubular sheath portion.

3. A rotation coupling device according to claim 2, wherein said buffer means is made of felt.

4. A rotation coupling device according to claim 1, wherein the inner surface of said tubular sheath has a hexagonal cross-sectional configuration.

5. A rotation coupling device for use between a drive member and a driven member for suppressing stationary wave vibrations, said device comprising:
- a tubular sheath comprising a plurality of tubular portions;
- a flexible rotating shaft inserted through said tubular sheath; and
- at least one means for suppressing stationary wave vibrations occurring along said flexible rotating shaft during rotation thereof; said suppressing means including a tubular sheath joint mounted on said tubular sheath to receive ends of two adjacent tubular portions so as to connect the tubular portions to each other, and being disposed at an antinodal point of the stationary wave vibrations, said suppressing means comprising a radially inwardly protruding annular member formed on said tubular sheath joint and having an inner diameter slightly larger than the outer diameter of the rotating shaft.

6. A rotation coupling device for use between a drive member and a driven member for suppressing stationary wave vibrations, said device comprising:
- a tubular sheath;
- a flexible rotating shaft inserted through said tubular sheath; and
- at least one means for suppressing stationary wave vibrations occurring along said flexible rotating shaft during rotation thereof; said suppressing means comprising a tubular sheath joint mounted on said tubular sheath and disposed at an antinodal point of the stationary wave vibrations; and
- wherein said tubular sheath comprises a plurality of tubular portions, and said tubular sheath joint comprises a cylindrical body having an inner diameter substantially corresponding to the outer diameter of said tubular sheath portions; said tubular sheath joint further comprising a radially inwardly protruding annular member formed on the inner surface of said cylindrical body having an inner diameter slightly larger than the outer diameter of the rotating shaft; said tubular portions of said sheath being joined by inserting their respective ends into said cylindrical body.

* * * * *